INVENTORS
JAN M. DREES
HENRY E. SAWICKI

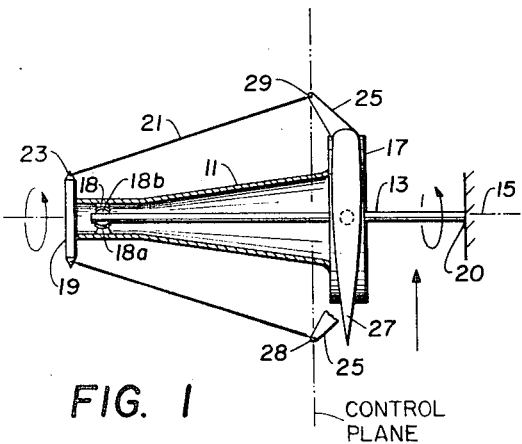
FIG. 1
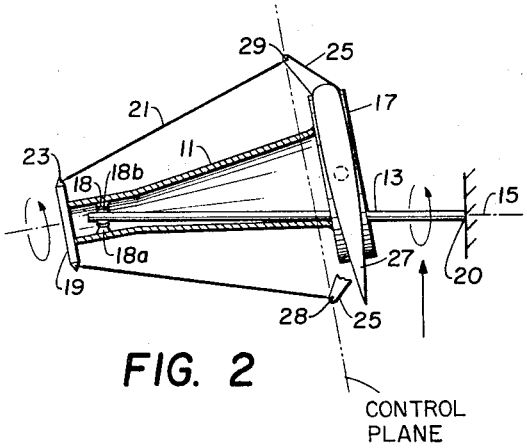
FIG. 2
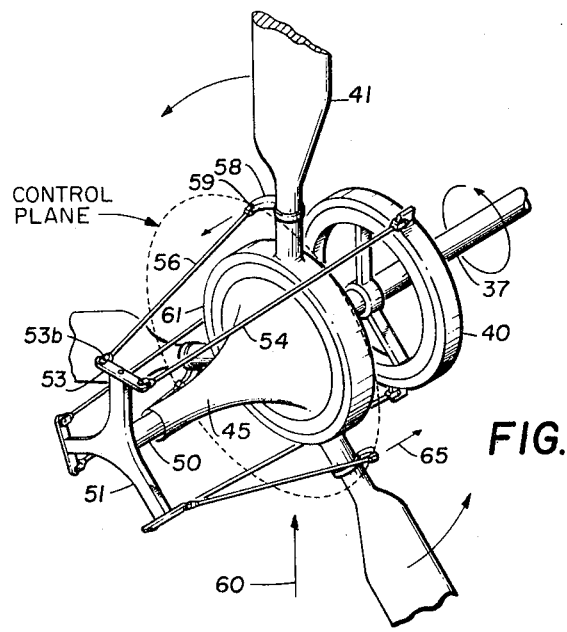
FIG. 3
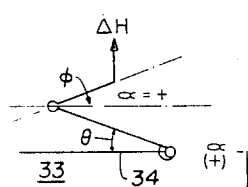
FIG. 4
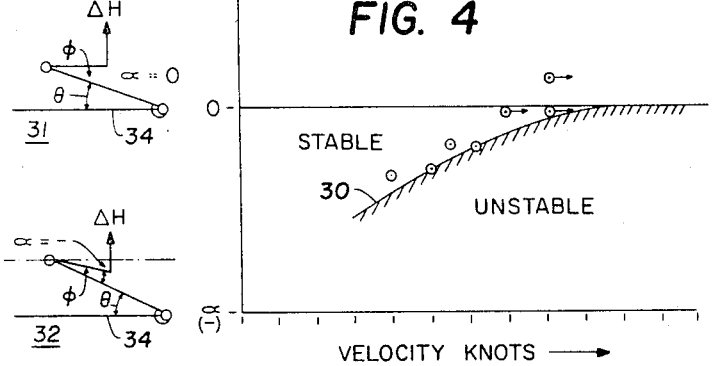
INVENTORS
JAN M. DREES
HENRY E. SAWICKI
ATTORNEY

ATTORNEY

INVENTORS
JAN M. DREES
HENRY E. SAWICKI

ATTORNEY

United States Patent Office 3,451,484
Patented June 24, 1969

---

3,451,484
FOCUS ROTOR STABILIZATION
Henry E. Sawicki, Arlington, and Jan M. Drees, Dallas,
Tex., assignors to Bell Aerospace Corporation, Hurst,
Tex., a corporation of Delaware
Filed May 9, 1967, Ser. No. 637,118
Int. Cl. B64c 27/52, 27/54
U.S. Cl. 170—160.26          17 Claims

ABSTRACT OF THE DISCLOSURE

Apparatus for stabilizing a flappingly pivoted prop-rotor operating in the airplane configuration. The rotor stabilization system includes a stub mast upon which the rotor is mounted, and which is in turn pivotally connected to a main mast. The pivoting action of the stub mast with respect to the main mast permits displacement of the rotor and focusing of the rotor control plane on a point in advance of the rotor so as to include stabilizing corrective cyclic pitch in the rotor.

FIELD OF THE INVENTION

This invention relates to an aircraft that includes a pylon-supported flapping prop-rotor which provides for vertical lift in a helicopter configuration and translational thrust in an airplane configuration. In a more specific aspect, the invention relates to the means for stabilizing such a system in the airplane mode by providing a rotor that is flappingly pivoted on a compound pylon which has its control plane focused at a point ahead of the rotor.

BACKGROUND OF THE INVENTION

One of the factors that has held back the general use of helicopter-type aircraft is that they cannot compete with fixed-wing aircraft in forward travel speed. There are several limiting, or at least hindering, factors which prevent substantially increasing the forward speed of a standard helicopter. As the helicopter's forward flight speed increases, there is less and less difference between the airstream velocity and the velocity of the blades during the part of their cycle in which they are moving rearward. Since the retreating blades must continue to contribute their proportionate share of the lift, the angle the blade takes in the rearward direction of travel must be increased. At high flight speeds this angle becomes so steep it produces a stall condition.

To some aircraft designers, this and other problems resulting from attempting to increase the forward speed of a helicopter, makes it appear that vertical takeoff and landing fixed-wing aircraft using conventional propellers may eventually replace the helicopter. However, the VTOL type aircraft are not desirable for sustained hovering conditions in that they require as much as twenty-five times more power to hover than a helicopter. It would seem, therefore, that a compound helicopter, that is one using a conventional helicopter rotor pivotal between a vertical and a horizontal position, which is a moderate compromise retaining the helicopter's main features with some assistance from fixed wings, is one solution to the problem of increasing the speed of a helicopter without increasing power plant requirements.

Compound helicopters have been flown and have shown to be satisfactory. However, in the airplane configuration wherein the rotor performs the function of an airplane propeller, the system is somewhat unstable at advanced forward speeds.

In accordance with the present invention, there is provided a system for introducing cyclic pitch to rotor blades in an amount proportional to displacement of the rotor in response to an upsetting force. The rotor cyclic pitch is introduced in a manner which opposes the forces tending to upset the rotor and thus tend to return the rotor to its original position.

SUMMARY OF THE INVENTION

A pylon mounted rotor has its control plane focused in advance of the rotor plane to enhance fixed-wing mode of operation stability by providing a main mast relatively rigidly coupled to a wing, a stub mast pivotally mounted to said main mast with a resilient coupling and a rotor flappingly connected to the stub mast. Cyclic pitch of the rotor blades is introduced in response to displacement of said stub mast relative to the main mast to oppose forces tending to produce rotor instability.

THE DRAWINGS

FIGURE 1 is a diagrammatic illustration of a system embodying the present invention wherein the control plane of a pylon-mounted rotor is focused at a pivot point in advance of the rotor;

FIGURE 2 is a diagrammatic illustration of the system of FIGURE 1 which illustrates the introduction of corrective cyclic control upon displacement of the rotor and stub mast;

FIGURE 3 is a diagrammatic illustration of another system embodying the present invention;

FIGURE 4 is a diagram which illustrates stable and unstable relationships involving relative stiffnesses of the main and stub masts;

PREFERRED EMBODIMENTS

Figure 5:
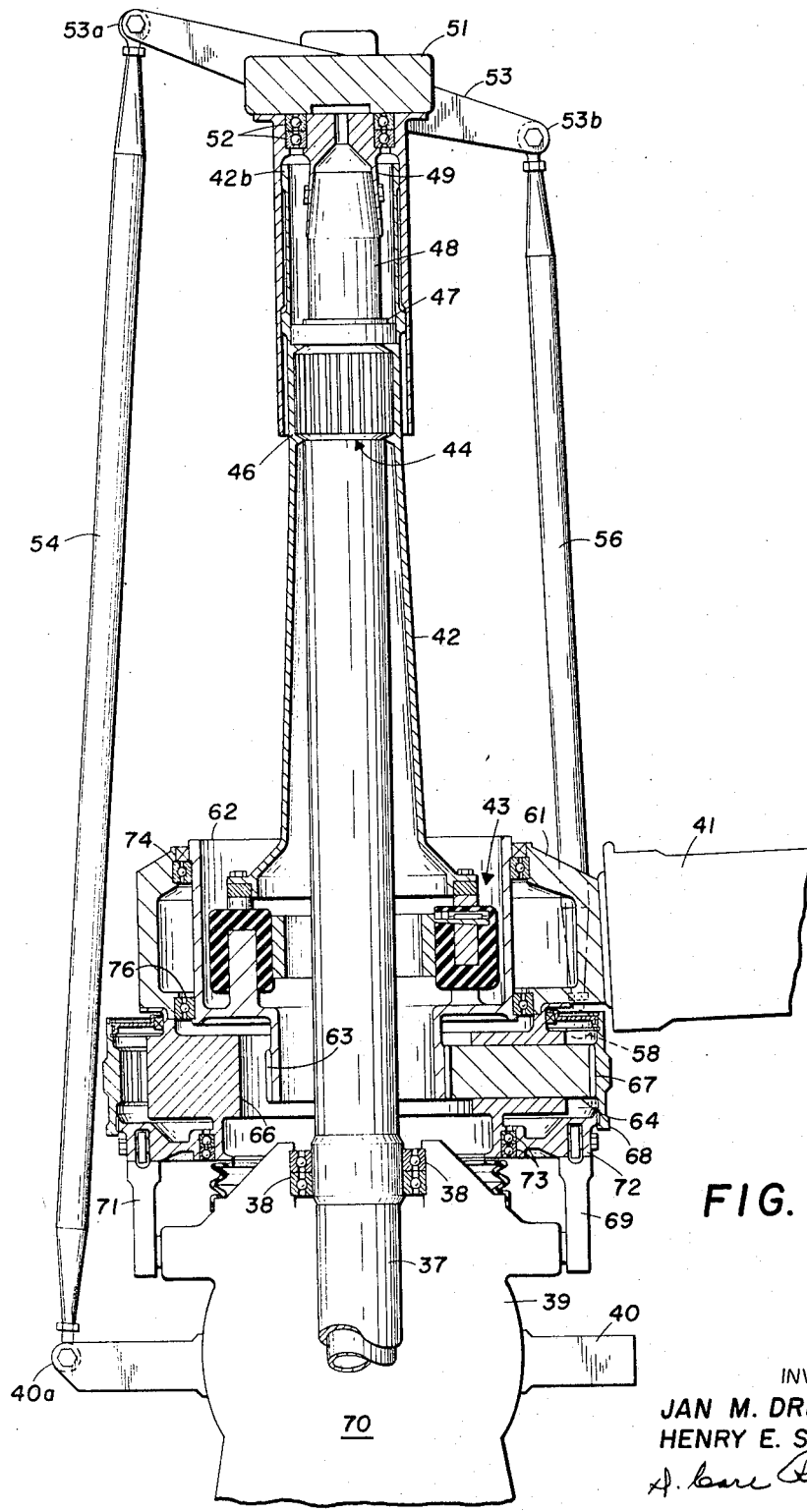
FIGURE 5 illustrates a preferred embodiment of the invention.

The imposition of cyclic pitch on rotating rotor blades of a conventional helicopter is determined by the angular relationship between the rotor tip-path plane and the swashplate which establishes what is referred to as the rotor control plane. It may otherwise be stated that cyclic pitch is established by the angular displacement between (1) the rotor tip-path plane and (2) the plane of rotation of the points of attachment between the control tubes leading from the swashplate and the rotor blade pitch horns, since the plane of rotation of the pitch horn attachment points is parallel to the plane of rotation of the swashplate. With this in mind and referring to FIGURE 1, the swashplate 19 is shown to establish a control plane through pitch horn attachment points 28 and 29. As the control plane and the rotor tip-path plane are shown to be parallel, the rotor as illustrated is not operating with cyclic pitch imposed upon it. Of course, were the swashplate to be tilted relative to the tip-path plane, then cyclic pitch would be imposed upon the rotor blades; or were the rotor tip-path lane to be tilted with relation to the swashplate, as might be caused by a gust, cyclic pitch would then also be imposed upon the rotor blades.

In FIGURE 1, which diagrammatically illustrates a system embodying the present invention, swashplate 19 is rigidly fixed to one end of stub mast 11 which is mounted at point 18 to main mast 13 which extends outwardly from its mounting 20 on axis 15 to the convertiplane wing or fuselage (not shown). The pivot 18 includes a ball which permits tilting of the stub mast 11 with respect to main mast 13, and the main mast rotatively drives the stub mast by means of teeth, part of the stub mast, which mesh with splines, an integral part of the ball. While the swashplate will ordinarily be controllably tilted during helicopter flight, it may be locked in position during airplane flight and will be assumed to be locked in position perpendicular to the main mast 13 for purposes of this disclosure. Hub 17 is attached at the other end of stub mast 11 and carries rotor blades 27 rotatably mounted around bearings of the hub spindles (not shown) in the usual manner. Pitch horns 25 attach to the leading edges of the rotor blades 27, and are also connected to the rotating portion of the swashplate 19 from points 29 of pitch horn 25 to points 23 of swashplate 19 by means of control tubes 21.

In conventional structure the rotor has been connected directly to the main mast. With the rotor conventionally connected to the main mast, it has been found that a serious rotor instability exists in the advanced speeds of airplane flight, whereby disturbing forces, such as gusts, will initiate a tilting of the rotor. As a result of the high air inflow through the prop-rotor, the tilting induces an in-plane rotor force that causes the mast to pitch and further induce destabilizing rotor in-plane forces, etc. As previously indicated, the present invention is directed at eliminating or minimizing this type of instability and the manner in which the embodiment diagrammatically illustrated in FIGURE 1 achieves this purpose will now be discussed with reference to FIGURE 2.

In FIGURE 2, the rotor is shown displaced upwardly, presumably as a result of the destabilizing in-plane force indicated by the arrow and as may be permitted by the attachment of stub mast 11 to the main mast 13. Displacement of the rotor upwardly will cause the stub mast 11, hub 17, blades 27, pitch horns 25, tubes 21 and swashplate 19 to rotate as a unit around ball 18, and the rotor will assume an attitude in space, as indicated by the rotor control plane through points 29, that will provide a restoring force in opposition to the disturbing force. In this configuration, no blade pitch change relative to the hub 17 will be induced by rotation of blades 27 around their pitch change bearing attachment to hub 17, although it will be appreciated that a cyclic pitch change is induced to the mast 13.

Referring now to FIGURE 3, there is shown schematically a system in accordance with the present invention in which the swashplate is mounted on the main mast rather than on the stub mast as in FIGURES 1 and 2 and in which, unlike the system of FIGURES 1 and 2, cyclic pitch change of the blades around their pitch change bearings is induced by the displacement of the rotor. Specifically referring to vertically extending blade 41, the swashplate 40 is mounted on the main mast and is connected to walking beam 53 pivotally attached to the collective head 51 by means of the cyclic control tube 54. The walking beam is in turn connected to the pitch horn 58 of the blade 41 by means of a pitch change tube 56. Thus, each of the blades of the rotor is connected to the hub 61 and coupled to the swashplate 40 by means of a pitch change tube, a walking beam, and a cyclic control tube, as explained. Hub 61 is resiliently mounted on the stub mast 45 which is connected to main mast 37 at 50. Assuming that a disturbing force has caused the rotor to move in the direction indicated by arrow 60, it will be appreciated that such movement will tend to cause point 59 to move away from point 53b. Inasmuch as the two points are connected by tube 56, the result will be that point 59 will have relative movement with respect to the blade and will cause the blade pitch to increase. This will occur to each blade as it passes the position of blade 41. When a blade is diametrically opposed to the illustrated position of blade 41, the rotor displacement defined by arrow 65 will cause that blade pitch to decrease. Thus, corrective cyclic pitch is imposed upon the rotor as a result of the rotor displacement. Another way of looking at it is to consider that movement of the rotor causes the control plane (determined by the plane of rotation of points on the pitch horns) to tilt and it will, in the case of this diagrammatic example as well as that of FIGURE 2, be focused or directed at the point of pivotal connection between the stub mast and the main mast.

In the above discussion of FIGURES 1, 2 and 3, it has been assumed that the main mast is rigidly attached around its conversion axis to the wing or fuselage with no resiliency or relative movement. As a practical matter such construction is impossible and there will, of course, be some resiliency and relative motion of the main mast to the aircraft either as a result of its own structural limitations or those of its mounting. Although it is desirable that the main mast be rigid in itself and be rigidly attached, absolute rigidity is not critical. What is critical is the relative rigidity between the main mast (including all its attachment structure) and the stub mast and this criticality is illustrated in FIGURE 4. The instability boundary 30 has been plotted thereon as a function of the forward velocity versus angle $\alpha$ which is the net tilting of the control plane of the rotor in response to the movement of the rotor effected by the disturbing in-plane force $\Delta H$. Considering the aircraft as flying to the left, line 34 of diagrams 31, 32 and 33 represents the undisturbed position of the main mast 13 and the stub mast 11. The three diagrams illustrate the destabilizing, neutrally stabilizing and positively stabilizing effect, respectively, as will be introduced by differing degrees of relative resiliency between the main and stub masts. Angle $\alpha$ represents the net tilting of the stub mast with respect to its previously undisturbed position and is obviously the geometrical summation of angles $\theta$ and $\phi$, the tilting of the main mast and the tilting of the stub mast with respect to the main mast. As shown by the diagram 32, where $\alpha$ is negative, the angle $\theta$ exceeds the angle $\phi$, the control plane is not focused forwardly of the rotor but is focused rearwardly, and the system tends to be unstable. As shown, the instability is particularly accentuated at higher speeds.

In the neutrally stable case, represented by the diagram 31 where angle $\theta$ equals angle $\phi$, and thus the respective resiliencies of the main and stub masts may be considered equal, the craft is shown to be operable at very high speeds and still theoretically be in a stable operating zone. However, it has been found that at high speeds, operation should be above the curve 30 in order to maintain a margin of safety and avoid instability near the borderline. Inasmuch as the control plane of neutrally stable diagram 31 is directed neither forwardly nor rearwardly, but rather at infinity, it can be concluded that the resiliencies should be selected and designed so as to provide for focusing of the control plane at some finite point forwardly of the rotor as indicated in diagram 33.

In contrast with the systems illustrated by diagrams 31 and 32, diagram 33 represents a positively stable system wherein the angle $\theta$ is less than the angle $\phi$ and the stub mast (more accurately, the control plane) is focused about a point forward of and relatively close to the rotor. In practice the closer the virtual pivot point of the control plane is to the rotor, the greater the stabilizing force. As assumed in FIGURES 1, 2 and 3, when the virtual pivot point and the actual pivot point 18 coincide, the coupling between the main mast and the wing is absolutely rigid and the only resilience would be in the coupling between the main mast 13 and the stub mast 11.

In accordance with the invention, the couplings at points 18 and 20 are made such that angle $\phi$ will be at least equal to and preferably always exceed the angle $\theta$. By controlling the coupling between the stub mast 11 and the main mast 13 and the coupling between the main mast 13 and the wing, the rotor control plane can be made to always appear effectively pivoted or focused at a virtual pivot point ahead of the rotor.

Referring to FIGURE 5, there is shown a realization of the focused rotor concept described specifically with reference to FIGURE 3 above. In the system shown, the main mast 37 of pylon assembly 70 is mounted on bearings 38 for rotation by transmission 39. The pylon assembly 70 is provided with a conventional swashplate 40, the specific details of which are omitted. It will be understood, however, that in the high forward speed fixed-wing mode, the swashplate 40 will be held in a fixed position relative to the pylon. It will be further understood that the pylon is substantially rigidly secured to the wing in a horizontal position when the aircraft is in the airplane mode.

The main mast 37 rotates to impart driving power to the rotor blade system, one of the blades, the blade 41 being shown in FIGURE 5. The blade 41 and its supporting structure are coupled to a stub mast 42 by means of a gear train. The stub mast 42 is in the form of a hollow tapered body having a cylindrical bracket 43 at the lower end thereof to which the gear train of the rotor system is secured. The upper end of the stub mast 42 is rigidly secured to the end of the main mast 37. More particularly, the main mast 37 is provided with a spline section 44 near the upper end thereof. The stub mast 42 extends upward to point 42b and is provided with internal splines 46 which mate with the spline section 44 of the main mast. A ring nut 47 is screwed onto the upper end of the main mast and forces the spline section 46 onto the spline section 44 thereby forming a rigid driving coupling between the main mast 37 and the stub mast 42.

A collective control tube 48 extends upward through the main mast 37 and beyond the end thereof. Bolted to collective control tube 48 is a cap 49 to which a collective head 51 and its appendages are rotatably mounted by means of bearings 52. A walking beam 53 is pivotally mounted to the collective head 51. A cyclic control tube 54 is secured, at one end, to the pivot 40a on the swashplate 40 and at the other end to a pivot 53a on the walking beam 53. A pitch change tube 56 is similarly secured to a pivot 53b on the walking beam 53 and, at its lower end is secured to a pivot 58 at the end of the pitch horn (not shown) of blade 41.

Bolted to the lower end of the stub mast 42 is a cylindrical housing 62 having a sun gear 63 on its reduced diameter lower section. The sun gear 63 operates in conjunction with a plurality of planet gears, one of which, the gear 64, is shown in FIGURE 5. The planet gears are journaled for rotation with the stub mast 42 by means of a planet carrier 66 and engage a ring gear 67 formed on the inner surface of a cylindrical housing member 68. The ring gear 67 is restrained from rotation by means of antirotation lever arms 69 and 71 coupled to a circular shaped restraining hub 72 forming part of the housing 68. The antirotation lever arms 69 and 71 are semi-rigidly connected to the transmission 39.

The planet carrier 66 rotates with respect to the restraining hub 72 by means of duplexed bearings 73. The planet carrier 66 is rigidly connected to the hub 61 which is rotatably coupled to the cylindrical housing 62 by means of bearings 74 and 76.

In operation, the stub mast 42 and the cylindrical housing 62, with the sun gear 63, rotate at the speed of the main mast 37. The hub 61 rotates at the speed of the planet carrier 66; the planet carrier speed is determined by the ratio of the number of teeth on the ring gear 67 to the number of teeth on the sun gear 63. In one embodiment, the main mast operated at 1500 r.p.m. and the hub 61, and in turn the blades 41, operated at 400 r.p.m. The collective head 51 also rotates at the speed of the hub 61, thus requiring bearings 52 to support the rotating collective head, the cyclic control tube 54 and the pitch change tube 56 as they rotate with respect to the stationary collective control tube 48.

Collective pitch control, that is the change of pitch on all the blades of the rotor to the same extent and in the same direction, is imposed on the rotor by controls (not shown) that raise or lower control tube 48 and collective head 51, causing the walking beam 53 to pivot about its attachment to head 51 with attachment point 53a acting as a fulcrum to increase or decrease blade pitch by raising or lowering control tube 56.

It will now be seen that the resilience present in the stub mast 42 relative to the main mast 37 will permit deflection or displacement of the stub mast and by reason of the coupling of the pitch horn through the tubes 56 and 54 and the walking beam 53 back to the fixed point 40a, a change in pitch will be effective on the rotor blades as a result of such displacement. The change in pitch is effective to produce forces which are opposite to the forces produced by movement of the pylon.

While only one pitch control tube and one pitch change tube have been shown operated by the beam 53, it will be understood that a similar linkage is provided for each of the rotors and that each blade will be provided with a pitch horn to which the coupling terminates, such as shown in FIGURE 3.

Figure 6:
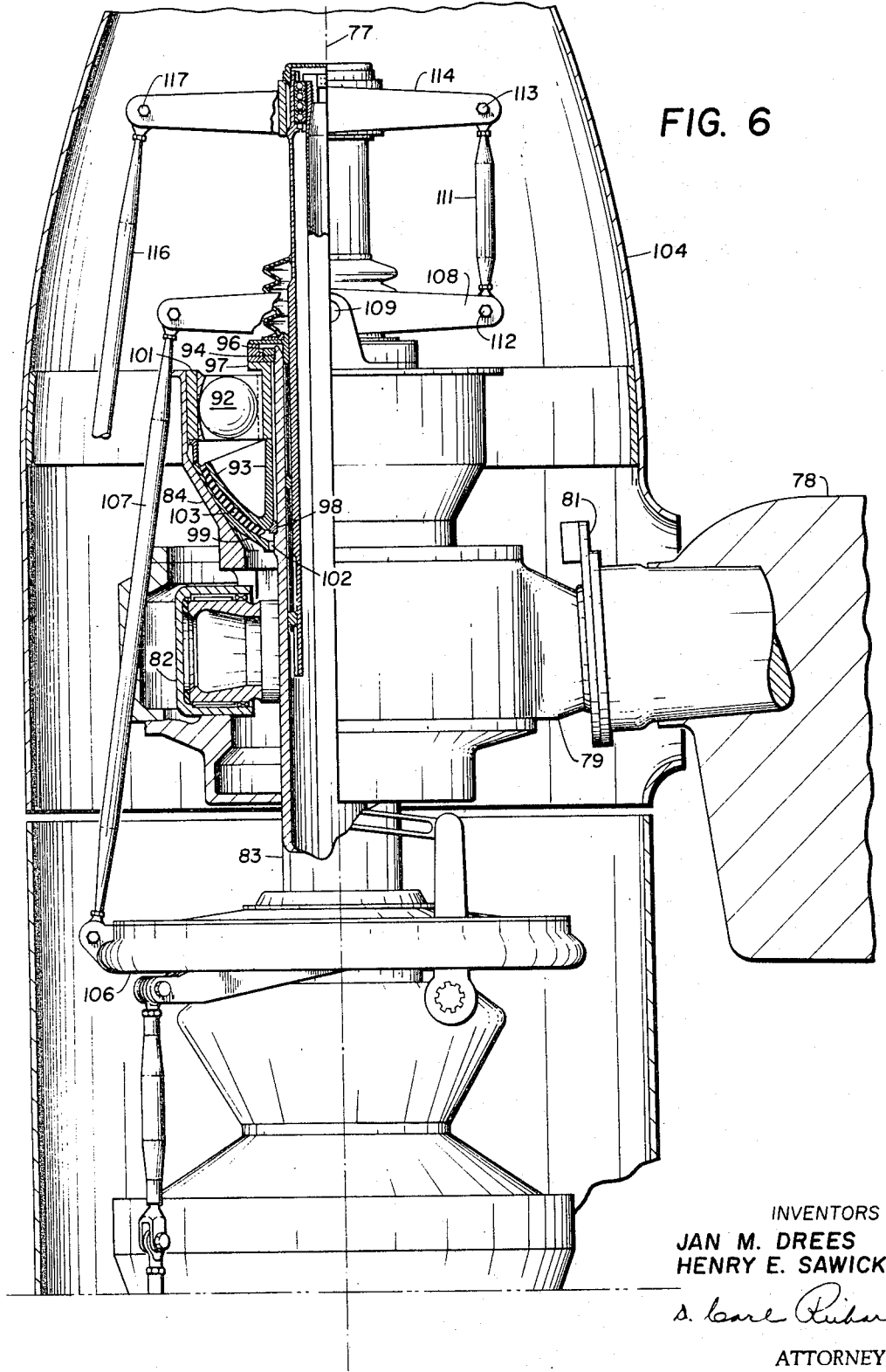
FIGURE 6 illustrates another embodiment of the invention.

While the system shown in FIGURE 5 represents a preferred embodiment and clearly illustrates the principles of a focused rotor, it will be appreciated that other forms of focused rotor systems may be employed. One such form is shown in FIGURE 6, wherein the elements to the left of the center line 77 are shown in section and the same elements as they appear to the right of the center line 77 are shown in plan. In this system, three rotor blades, such as rotor blade 78, are mounted at 120° intervals on a rotor hub 79 and each provided with a pitch horn 81. The hub 79 is driven by a gimbal 82 including a pillow block housing 84.

The housing 84 is rotatably coupled to the main mast 83 by means of a universal joint involving a set of balls, such as the ball 92, so as to permit movement of the housing 84 relative to the main mast. More particularly, the universal joint includes an inner bowl 93 having a spline section in engagement with a mating spline section of the main mast 83. The main mast 83 is provided with a threaded upper end 94 onto which a nut 96 is screwed which engages a mounting ring 97 to force the inner bowl 93 down onto a seating ring 98. The outer surface of the inner bowl 93 is concentric with the inner surface of an outer bowl 99 mounted within the housing 84. The outer bowl 99 is maintained in position by a ring 101 screwed into the upper end of the housing 84; the inner surface of the ring 101 is in contact with the balls of the universal joint, such as the ball 92.

It will be noted that there is a small cylindrical aperture 102 between the lower end of the bowl 99 and the outer surface of the main mast 83. Thus, the rotor blade structure which is partially supported on the housing 84 may be displaced relative to the main mast 83. It will further be noted that a rubber body 103 is molded between the outer surface of the bowl 93 and the inner surface of the bowl 99. This resilient coupling effectively controls the spring constant of the coupling between the main mast 83 and the stub mast which in this embodiment is formed by the housing 84 and the rotor hub 79. Because of the geometry of the bowls 93 and 99, the rubber body 103 permits displacement of the two bowls relative to each other thereby placing the rubber body under shear stress. The lower end of the bowl 99 limits the displacement by providing a stop against the outer surface of the main mast. In this case, it will now be appreciated that, by reason of the fixed coupling between the bowls 93 and 99, the mast 83 and the rotor blade 78 rotate at the same speed. The rotating system except for the blades 78 is enclosed within a spinner housing 104.

In the system of FIGURE 6, a swashplate 106 is coupled by means of a cyclic tube 107 to a walking beam 108 pivoted at the upper end of the main mast 83 at pivot 109. As described earlier with reference to FIGURE 5, the swashplate 106 is maintained in a fixed position when the aircraft is in the fixed-wing mode. A link 111 is coupled between a pivot 112 on the walking beam 108 and a pivot 113 on the collective walking beam 114. A link 116 extends from a pivot 117 on the walking beam 114 to the pitch horn on a blade 78.

In operation, rotation of the main mast 83 is transmitted to the rotor hub 79 by means of the universal joint 92 and the housing 84. The blades 78, hub 79 and the spinner 104 rotate at the speed of the main mast 83. A displacement of the pylon as the result of a wind gust, for example, causes tilting of the rotor which, as a result of the high inflow of air through the prop-rotor under the high speed conditions of flight in the airplane configuration, will produce in-plane rotor forces causing the rotor to be displaced. As a result, of this displacement of rotors, the housing 84 and in turn the outer bowl 99 will be displaced relative to the inner bowl 93 as permitted by the resilient coupling between the inner bowl and the outer bowl. By reason of the coupling of the pitch horn 81 through the tubes 116, 111, and 107 and the walking beams 114 and 108 back to the fixed swashplate 106, a change in cyclic pitch of the rotor blades will be effective as the result of the displacement of the pylon. The change in pitch is effective to produce forces which are opposite to the forces that caused movement of the nylon and will thus restore it to its original position thereby stabilizing the aircraft in high speed forward flight.

Although preferred embodiments of the invention have been described in detail, it is to be understood that various changes, substitutions, and alterations can be made therein without departing from the spirit and scope of the invention as defined by the appended claims.

What we claim is:

1. A multi-blade rotor mechanically focused to enhance stability which comprises:
    a rotatable main mast journaled on a wing,
    a stub mast mounted on said main mast with a resilient coupling between said main mast and variable pitch rotor blades mounted on said stub mast, and
    a control linkage extending to said rotor blades for varying the pitch of said blades in response to displacement of said stub mast relative to said main mast to oppose instability produced by displacement of said main mast relative to said wing.

2. A stabilization system for a multi-blade rotor comprising:
    a main mast journaled at one end on said aircraft,
    a stub mast pivoted on said main mast at the free end of said main mast
    means for supporting said rotor on said stub mast at a point intermediate the length of said main mast, and
    means for varying the pitch of the blades of said rotor in accordance with a displacement of said stub mast relative to said main mast to develop a force which opposes the forces causing said displacement.

3. An aircraft rotor stabilization system as set forth in claim 2 wherein said pitch varying means includes a control linkage extending between said pylon and the rotor blades for varying the pitch of said blades in response to displacement of said stub mast.

4. A rotor stabilization system as set forth in claim 2 wherein the pivotal connection between said main mast and said stub mast has a resiliency such that the angular displacement of said stub mast relative to said aircraft is at least equal to the displacement of said main mast relative to said aircraft.

5. A stabilization system for a rotor mounted on an airframe comprising:
    a plurality of adjustable pitch blades mounted on a rotor hub,
    a main mast extending through said rotor hub and journaled on said airframe,
    a stub mast rotatably driven by said main mast and with a pivotal mounting on said main mast at a point displaced from the rotor hub opposite said airframe,
    means for coupling said rotor hub to said stub mast, and
    means for varying the pitch of said blades in accordance with the displacement of said stub mast relative to said main mast to produce a force that opposes the forces causing said displacement.

6. An aircraft rotor stabilization system as set forth in claim 5 wherein said stub mast is a hollow tapered tube with the smaller diameter section connected to said main mast and the other end coupled to said rotor.

7. An aircraft rotor stabilization system as set forth in claim 6 wherein the pivotal connection between said main mast and said stub mast has a resiliency such that the angular displacement of said stub mast relative to said airframe is at least equal to but preferably greater than the displacement of said main mast relative to said airframe.

8. An aircraft rotor stabilization system as set forth in claim 6 wherein said coupling means is a gear train speed reducer.

9. An aircraft rotor stabilization system as set forth in claim 5 wherein said pitch varying means includes:
    a collective pitch tube mounted through said main mast and extending past the end thereof displaced from said rotor opposite said pylon,
    a walking beam pivotally connected to said collective pitch tube at the end extending from said main mast,
    a first control tube connected to one end of said walking beam and to said pylon, and
    a second control tube connected to the end of said walking beam opposite said first tube and to the rotor blades.

10. A rotor stabilization system for an aircraft operable in a helicopter configuration and convertible to operation as a fixed-wing aircraft comprising:
    a pylon supported by said aircraft,
    a rotor having a plurality of adjustable pitch rotor blades connected to a rotor hub,
    a main mast rotatably mounted to said pylon and extending therefrom through said rotor hub,
    a stub mast pivotally mounted on said main mast at a point displaced from said rotor opposite the pylon support point,
    means for coupling said stub mast to said rotor, and
    means for cyclic control of the pitch of said rotor blades when the aircraft is operating in a helicopter configuration and for additionally varying the pitch of said blades in accordance with the displacement of said stub mast relative to said main mast to produce a force that opposes the forces causing said displacement.

11. A rotor stabilization system as set forth in claim 10 wherein separate pitch control means are provided for each of said plurality of rotor blades.

12. The rotor stabilization system as set forth in claim 11 wherein each of said rotor blades includes a pitch horn connected to said pitch controlling means.

13. A rotor stabilization system as set forth in claim 12 wherein said pitch control means includes:
    a swashplate mounted to said pylon,
    a collective control pitch tube mounted through said main mast and extending past the end thereof displaced from said rotor opposite from said pylon,
    a plurality of walking beams, one for each of said rotor blades, pivotally mounted to the end of said collective tube extending from said main mast,
    a plurality of cyclic control tubes, one for each of said walking beams, extending from one end of said walking beam to said swashplate, and
    a plurality of pitch change tubes, one for each of said plurality of rotor blades, extending from the end of the walking beam opposite said cyclic control tube to said rotor blade.

14. A rotor stabilization system as set forth in claim 13 wherein said stub mast is a tapered tube having a spline formed at its narrow end in engagement with a mating spline section of said main mast and having its other end connected to said coupling means.

15. A rotor stabilization system as set forth in claim 14 wherein said coupling means includes a gear train reducer.

16. A rotor stabilization system as set forth in claim 5 wherein said pivotal mounting includes two concentrically mounted substantially spherical-shaped members resiliently coupled to each other, said first member connected to said main mast and said second member connected to said stub mast.

17. A stabilization system for a multi-bladed rotor for an aircraft having a fuselage comprising:

(a) a rotatable main mast journaled at one end thereof on said fuselage,
(b) a stub mast resiliently mounted on the other end of said main mast and coupled to said main mast to be rotatably driven thereby, and
(c) means adapting said rotor to said tub mast at a point between the attachment of said main mast to said fuselage and the resilient mounting of said stub mast to said main mast for developing forces which oppose forces causing angular displacement of the axis of said rotor and said stub mast relative to the axis of said main mast.

References Cited

UNITED STATES PATENTS

| 2,450,491 | 10/1948 | Solovioff et al. | 170—135.26 |
| 2,961,051 | 11/1960 | Wilford et al. | 170—160.26 X |
| 3,087,690 | 4/1963 | Doman et al. | 244—17.27 |

EVERETTE A. POWELL, Jr, Primary Examiner.

U.S. Cl. X.R.

170—160.13, 160.27